United States Patent
Park

(10) Patent No.: US 8,359,125 B2
(45) Date of Patent: Jan. 22, 2013

(54) ENERGY MANAGEMENT SYSTEM TO REDUCE THE LOSS OF EXCESS ENERGY GENERATION

(75) Inventor: Daniel J. Park, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 294 days.

(21) Appl. No.: 12/817,468

(22) Filed: Jun. 17, 2010

(65) Prior Publication Data

US 2011/0313585 A1    Dec. 22, 2011

(51) Int. Cl.
*G05D 17/00*    (2006.01)

(52) U.S. Cl. .......................... 700/295; 700/22; 700/291

(58) Field of Classification Search .................. 700/22, 700/286, 291, 295–296
See application file for complete search history.

(56) References Cited

U.S. PATENT DOCUMENTS

| | | | |
|---|---|---|---|
| 4,916,328 A * | 4/1990 | Culp, III | ......................... 307/39 |
| 6,080,927 A | 6/2000 | Johnson | |
| 6,889,122 B2 | 5/2005 | Perez | |
| 7,155,320 B2 | 12/2006 | Gee | |
| 7,324,876 B2 | 1/2008 | Ying | |
| 7,373,222 B1 * | 5/2008 | Wright et al. | ................ 700/295 |
| 7,460,930 B1 | 12/2008 | Howell et al. | |
| 7,565,227 B2 | 7/2009 | Richard et al. | |
| 7,702,424 B2 | 4/2010 | Cannon et al. | |
| 2004/0128266 A1 | 7/2004 | Yellepeddy et al. | |
| 2005/0107892 A1 * | 5/2005 | Matsui et al. | ................... 700/28 |
| 2006/0036349 A1 | 2/2006 | Kates | |
| 2008/0040295 A1 * | 2/2008 | Kaplan et al. | ................ 705/412 |
| 2009/0105888 A1 | 4/2009 | Flohr et al. | |
| 2009/0164393 A1 | 6/2009 | Takano et al. | |
| 2010/0017045 A1 | 1/2010 | Nesler et al. | |
| 2010/0138062 A1 | 6/2010 | Zheng et al. | |
| 2010/0138363 A1 | 6/2010 | Batterberry et al. | |

\* cited by examiner

*Primary Examiner* — Sean Shechtman

(74) *Attorney, Agent, or Firm* — Brooks Acordia IP Law, PC; Pejman Yedidsion; David Ripma

(57) ABSTRACT

Systems and devices for, and methods of, adaptive local energy storage capacity by changing operating set points of regulated energy load devices based on the presence, or absence, of an excess of available, generated energy.

15 Claims, 6 Drawing Sheets

ENERGY MANAGEMENT SYSTEM TO REDUCE THE LOSS OF EXCESS ENERGY GENERATION

TECHNICAL FIELD

Embodiments pertain to systems and devices for, and methods of, adaptive local energy storage capacity.

BACKGROUND

Energy consuming devices commonly consume energy to maintain some measurable condition within normal bounds. For example, a refrigerator will cycle its compressor to maintain an internal temperature between low and high temperature set points. Similarly regulated devices include air conditioners, freezers, air handling systems and water heaters. Residential solar panels and wind-based electrical power generating systems may dump generated energy when they exceed the capacity of their respective target electrical system to absorb the load. This dumping can occur when the target electricity grid is disconnected due to an outage, when the home operates off-grid, or when the capacity of an electrical component in the electric generation path is exceeded.

SUMMARY

Exemplary embodiments include systems, devices, and methods. For example, a device embodiment for energy management may comprise: a central processing unit (CPU) and memory where the CPU is configured to: (a) engage an energy load device of highest priority not already engaged via a control signal, wherein the control signal invokes at least one of: a set point override and a set point modification, if the energy supply level is greater than the measured energy consumption level; and (b) disengage an energy load device of lowest priority not already disengaged via a release signal, wherein the release signal invokes at least one of: a relinquishment of an override and a restoration of an original set point, if the energy supply level is less than the measured energy consumption level. The control signal of the exemplary device may comprise a command to override a set point of a regulated energy load device; and the release signal may comprise a command to restore a set point of a regulated energy load device having an overridden set point. The control signal of the exemplary device may comprise a command to shift one or more set points, of a regulated energy load device, from nominal values to preset values stored at the regulated energy load device; and the release signal may comprise a command to restore one or more shifted set points of a regulated energy load device to the nominal values. In some embodiments, the control signal of the exemplary device may comprise one or more set point updates and a command to replace nominal values of one or more set points of a regulated energy load device with an update value; and the release signal may comprise a command to restore one or more updated set point values of a regulated energy load device to the nominal values. In other embodiments, the control signal of the exemplary device may comprise one or more set point updates and a command to replace one or more set points of a regulated energy load device with an update value; and the release signal may comprise nominal values and a command to replace the one or more updated set point values of a regulated energy load device with the received nominal value. In other embodiments, the exemplary device may be configured to provide excess power to an external grid and provision this excess power to the external grid based on a capacity of the external grid to receive this excess power.

A method embodiment for energy management in a system of one or more energy load devices may comprise the steps of: (a) if the system comprises two or more energy load devices, then establishing an energy load device priority among the two or more energy load devices; (b) determining an energy supply level to the system; (c) determining a total energy consumption level based on the one or more energy load devices; (d) if the energy supply level is greater than the measured energy consumption level, then engaging a load device of highest priority not already engaged via a control signal, wherein the control signal invokes at least one of: a set point override and a set point modification; and (e) if the energy supply level is less than the measured energy consumption level, then disengaging a load device of lowest priority not already disengaged via a release signal, wherein the release signal invokes at least one of: a relinquishment of an override and a restoration of an original set point. The step of engaging may be via a control signal comprising a command to override a set point of a regulated energy load device; and the step of disengaging may be via a release signal comprising a command to restore a set point of a regulated energy load device having an overridden set point. The step of engaging may be via a control signal comprising a command to shift one or more set points, of a regulated energy load device, from nominal values to preset values stored at the regulated energy load device; and the step of disengaging may be via a release signal comprising a command to restore one or more shifted set points of a regulated energy load device to the nominal values. In some embodiments, the step of engaging may be via a control signal comprising one or more set point updates and a command to replace nominal values of one or more set points of a regulated energy load device with an update value; and the step of disengaging may be via a release signal comprising a command to restore one or more updated set point values of a regulated energy load device to the nominal values. In other embodiments, the step of engaging may be via a control signal comprising one or more set point updates and a command to replace one or more set points of a regulated energy load device with an update value; and the step of disengaging may be via a release signal comprising nominal values and a command to replace the one or more updated set point values of a regulated energy load device with the received nominal value. In other embodiments, the method of energy management further comprising the steps of: (a) determining whether the system has excess power; and (b) determining the capacity of an external grid to receive excess power generated by the system. In other embodiments, the method of energy management wherein power is delivered to an external grid having a determined capacity to receive excess power.

BRIEF DESCRIPTION OF THE DRAWINGS

Embodiments are illustrated by way of example and not limitation in the figures of the accompanying drawings, and in which.

DETAILED DESCRIPTION

An energy management system monitors the output of energy generation devices in the system and energy consuming devices in the system. When the energy management system detects that energy generation exceeds the ability of the system to absorb that energy, the energy management system checks energy load devices in the system, e.g., appliances in the home, that may be engaged beyond their respective regulated cycling, to absorb the excess energy. The energy load devices may be evaluated and prioritized based on: the efficiency at which they can use this energy, the amount of energy they can absorb, and by user preference.

The energy management system may then engage the loads to match the energy supply, and may do so based on the prioritized ranking of energy load devices in the system that are, as of yet, not engaged. Normal operating limits of the energy load devices may be set for maximum energy efficiency and the maximum operating limits of the load devices may be set for safety and user tolerance. So, when the difference between electricity generation and consumption returns to within a nominal range, such that this exceptional state is not required, the appliances that have absorbed this excess energy may then draw on this energy, via the delay of their respective next on-cycle, that may be extended with the re-application of their normal, or nominal, set points.

Examples of local regulated energy load devices include: a water heater that has preheated the hot water supply; an air conditioner that has pre-cooled the living space; a battery storage system that has charged into a less efficient state of charge; a food refrigeration system that has pre-cooled food, but not cooled below freezing; and a food freezer that has super cooled the food therein.

Figure 1:
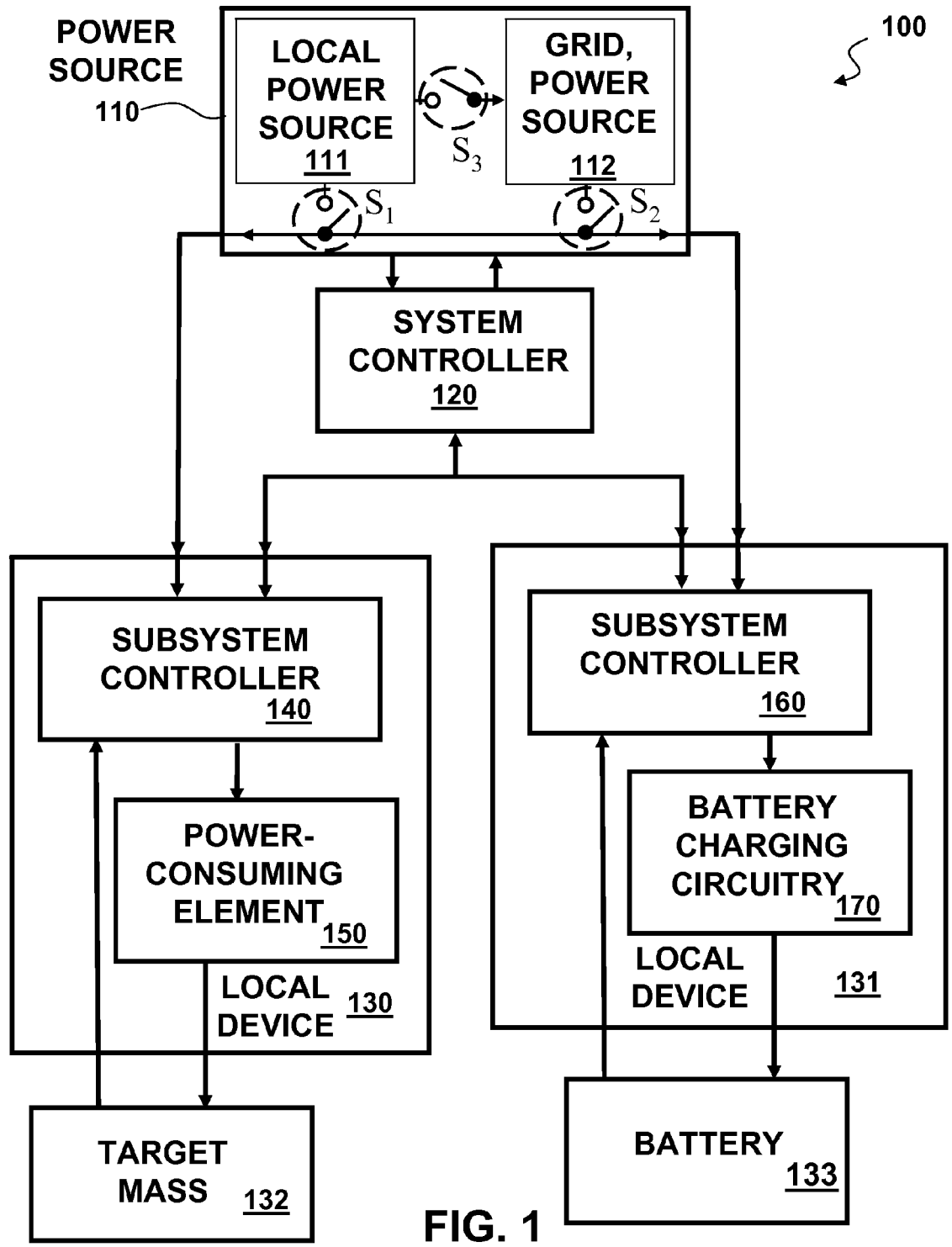
FIG. 1 is a functional block diagram of an exemplary system embodiment.

FIG. 1 is a functional block diagram of an exemplary system 100 embodiment where a power source 110 provides power to a first local device 130 and a second local device 131. The power source 110 may comprise a local power source 111 and/or the general electrical utility grid 112. A system controller 120 may direct power from either source 111, 112, for example, via power switches, $S_1$ and $S_2$. The system controller 120 is configured to monitor local power generation level of the local power source 111, and the power consumption levels of the local devices 130,131. Based on the generation and consumption levels, the system controller 120 may effect a closing of the first power switch, $S_1$, or a closing of the second power switch, $S_2$. If the local power source 111 is generating more power than can be consumed and stored by the local devices 130, 131, then the system controller 120 may effect a closing of a third power switch, $S_3$, and thereby direct at least a portion of the power being generated by the local power source 111 to the grid 112. Alternative embodiments to the exemplary power switches $S_1$, $S_2$, and $S_3$, may include power control circuitry to manage by direction the flow of energy. The first local device 130 is depicted as comprising a subsystem controller 140 and a power-consuming element 150. The power-consuming element 150 is depicted as effecting a change in the energy state of a target mass 132. The energy state of the target mass 132 is depicted as monitored by the subsystem controller 140. The second local device 131 is depicted as comprising a subsystem controller 160 and battery charging circuitry 170. The battery charging circuitry 170 is depicted as effecting a change in the energy state of a battery 133. The energy state of the battery 133 is depicted as monitored by the subsystem controller 160 of the second local device 131.

Figure 2:
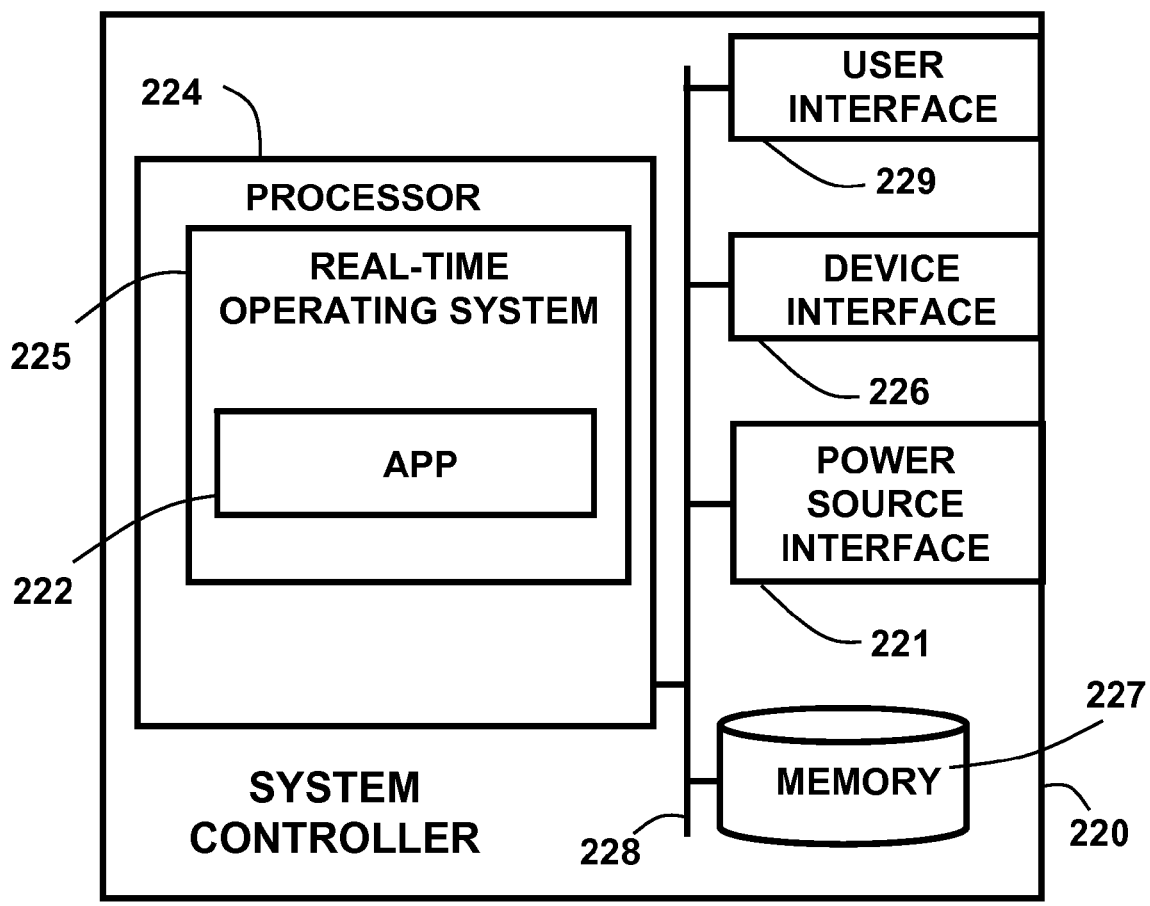
FIG. 2 is a functional block diagram of an exemplary system controller.

FIG. 2 is a functional block diagram of an exemplary system controller 220 having a processor 224 and memory 227 addressable via a data bus 228. A user interface 229, a power source interface 221, and an interface 226 by which one or more local devices may communicate with the processor 224 via the data bus 228. The processor 224 may be configured to execute programmed steps via a real-time operating system 225 where the steps that comprise the application 222 include energy consumption and/or energy production inputs that are taken or estimated, comparisons are made with load capabilities and priorities of engaging or disengaging load elements, and commands and/or values are sent to local devices for energy management.

Figure 3:
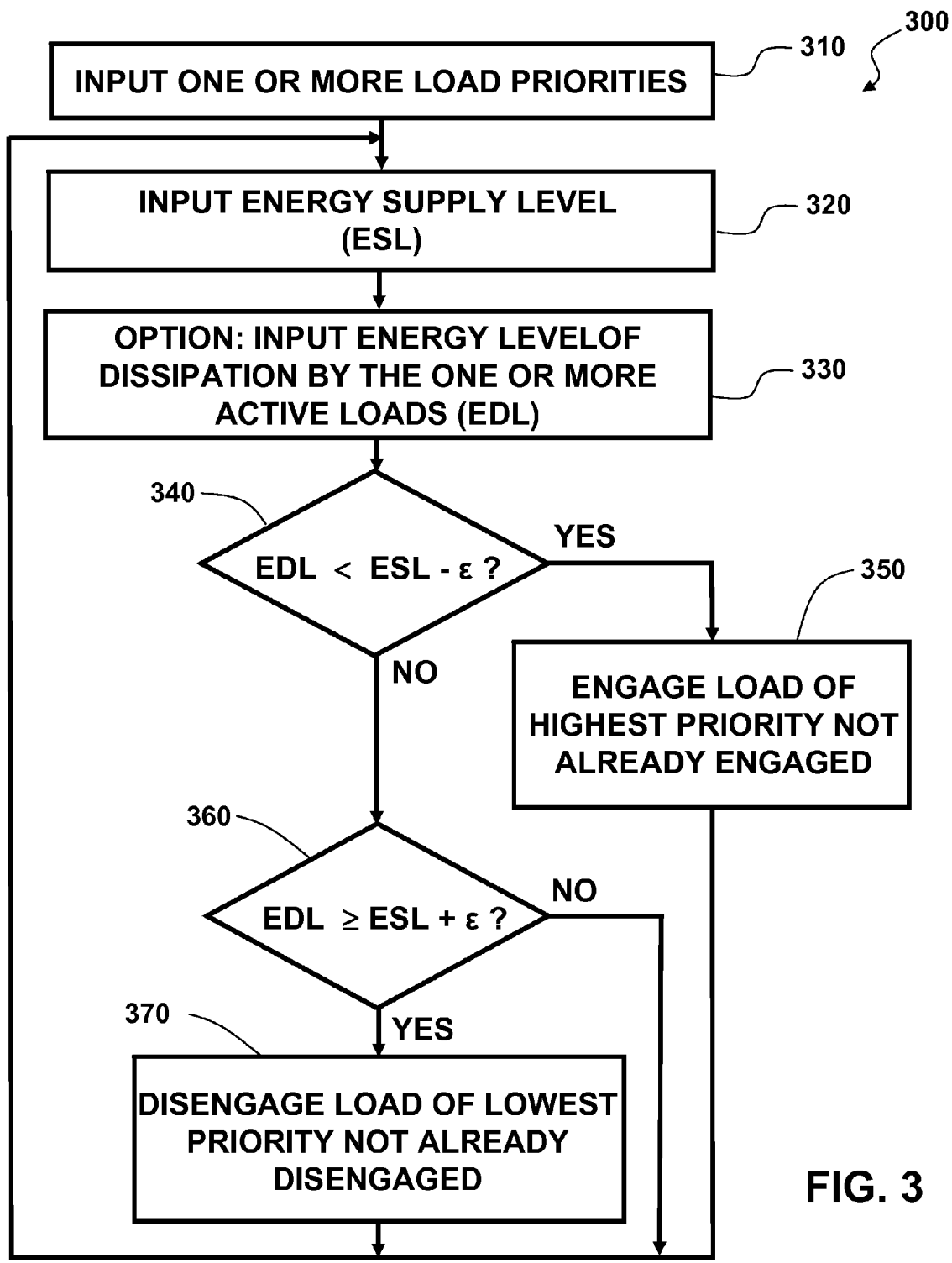
FIG. 3 is a flowchart depicting an exemplary process of the system controller.

For example, FIG. 3 is a flowchart depicting an exemplary process of the system controller 300. The system controller may be provided or be pre-loaded with a set of one or more energy load priorities. Accordingly, the system controller may input one or more energy load priorities (step 310) associated with the local devices of the system. The system controller is depicted in FIG. 3 as inputting (step 320) an energy supply level (ESL), i.e., the present level of generated energy available to the local devices under the control of the system controller. The system controller is also depicted as optionally inputting (step 330) or estimating the separate or combined energy level of dissipation (EDL), i.e., the combined energy consumption level, by the one or more active energy loads. An error margin, $\epsilon$, may be referenced to provide a hysteresis effect to the following exemplary switching logic. The system controller may test (test 340) whether the ESL, less the marginal value of $\epsilon$, is greater than the EDL. If so, then the system controller may output a command to effect an engagement of an energy load, not already engaged, that is the load of highest priority—i.e., according to the set of energy load priorities (step 350). If not, the system controller may test (test 360) whether the ESL, less the marginal value of $\epsilon$, is less than or equal to the EDL. If so, then the system controller may output a command to effect a disengagement of a load (step 370), not already disengaged, that is the energy load of lowest priority—according to the set of energy load priorities.

Figure 4:
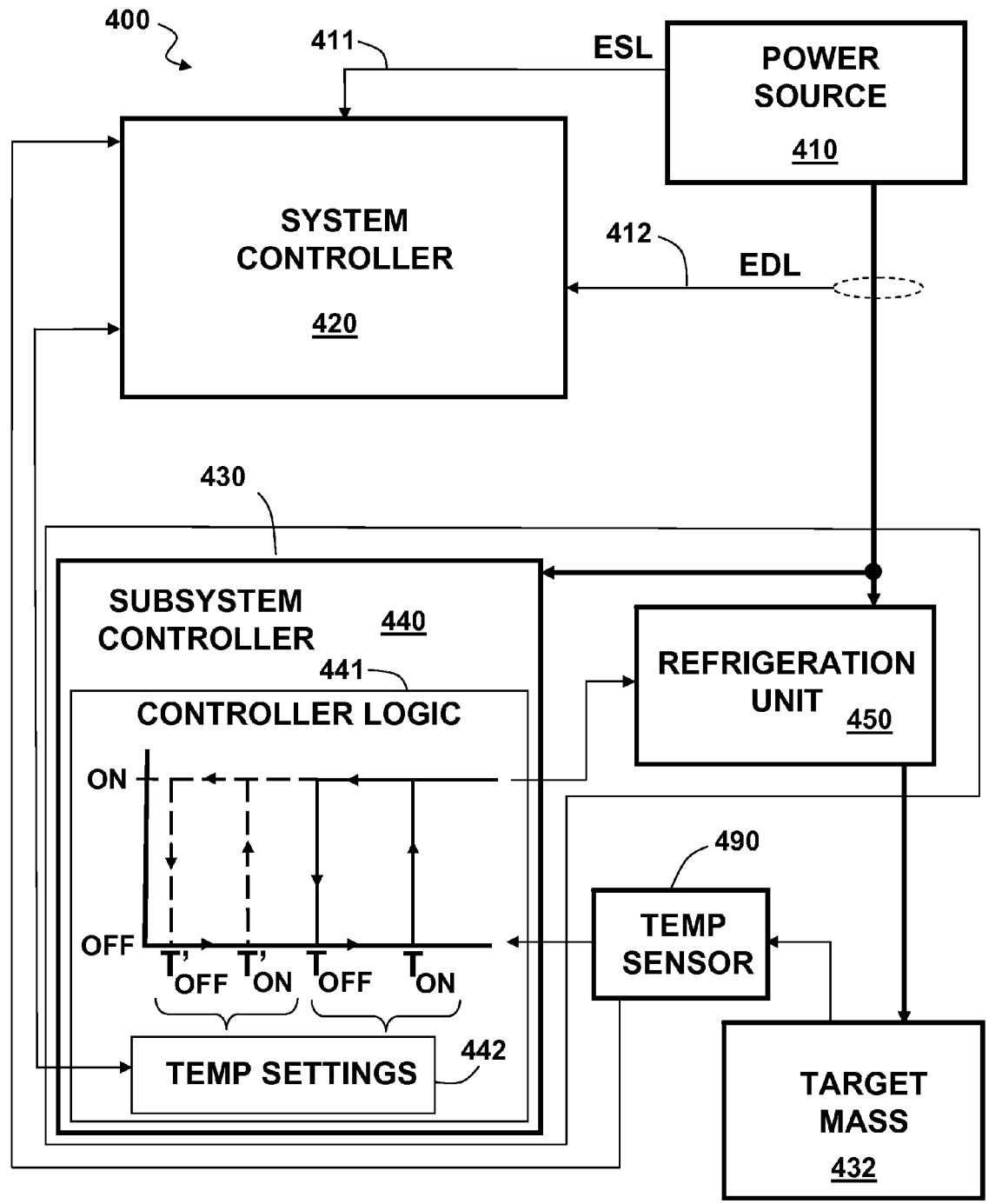
FIG. 4 is a functional block diagram of another exemplary system embodiment.

FIG. 4 is a functional block diagram of an exemplary system embodiment 400 comprising a power source 410, a system controller 420, a local device 430, a target mass 432, and a temperature sensor 490. The local energy load device 430 is depicted as comprising a subsystem controller 440 and a refrigeration unit 450. The system controller is depicted as inputting the energy supply level (ESL) 411 of the power source 410 and the energy dissipation level (EDL) 412 as being drawn from the power source 410 by the local device 430. The refrigeration unit 450 effects a change in the energy state of the target mass 432 and the temperature of the target mass 432 is depicted as being measured by a temperature sensor 490. The output of the temperature sensor may be provided to the subsystem control 440, the system controller 420, or both. The system controller 420 may generate a command to override the local logic of the subsystem controller 440 to effect an engagement or a disengagement of the refrigeration unit 450. The subsystem controller 440 may have controller logic 441, and the system controller 420 may generate a command to shift temperature settings 442 within the controller logic 441. For example, if the system controller 420 determines that, based on the difference between the energy supply level (ESL) 411 and the energy dissipation level (EDL) 412, the target mass 432 should be over-chilled to take advantage of the excess in generated energy, then the system controller 420 may send new temperature settings 442, e.g., $T'_{off}$ and $T'_{on}$. Optionally, the system controller 420 may send a signal to shift the temperature settings 442 to a stored set of temperature settings 442, e.g., $T_{off}$ to $T'_{off}$ and $T_{on}$ to $T'_{on}$. Also, if the system controller 420 determines that, based on the difference between the energy supply level (ESL) 411 and the energy dissipation level (EDL) 412, the target mass should be returned to default settings, then the system controller 420 may send a reset signal to reset the temperature settings 442, e.g., $T'_{off}$ to $T_{off}$ and $T'_{on}$ to $T_{on}$.

Figure 5:
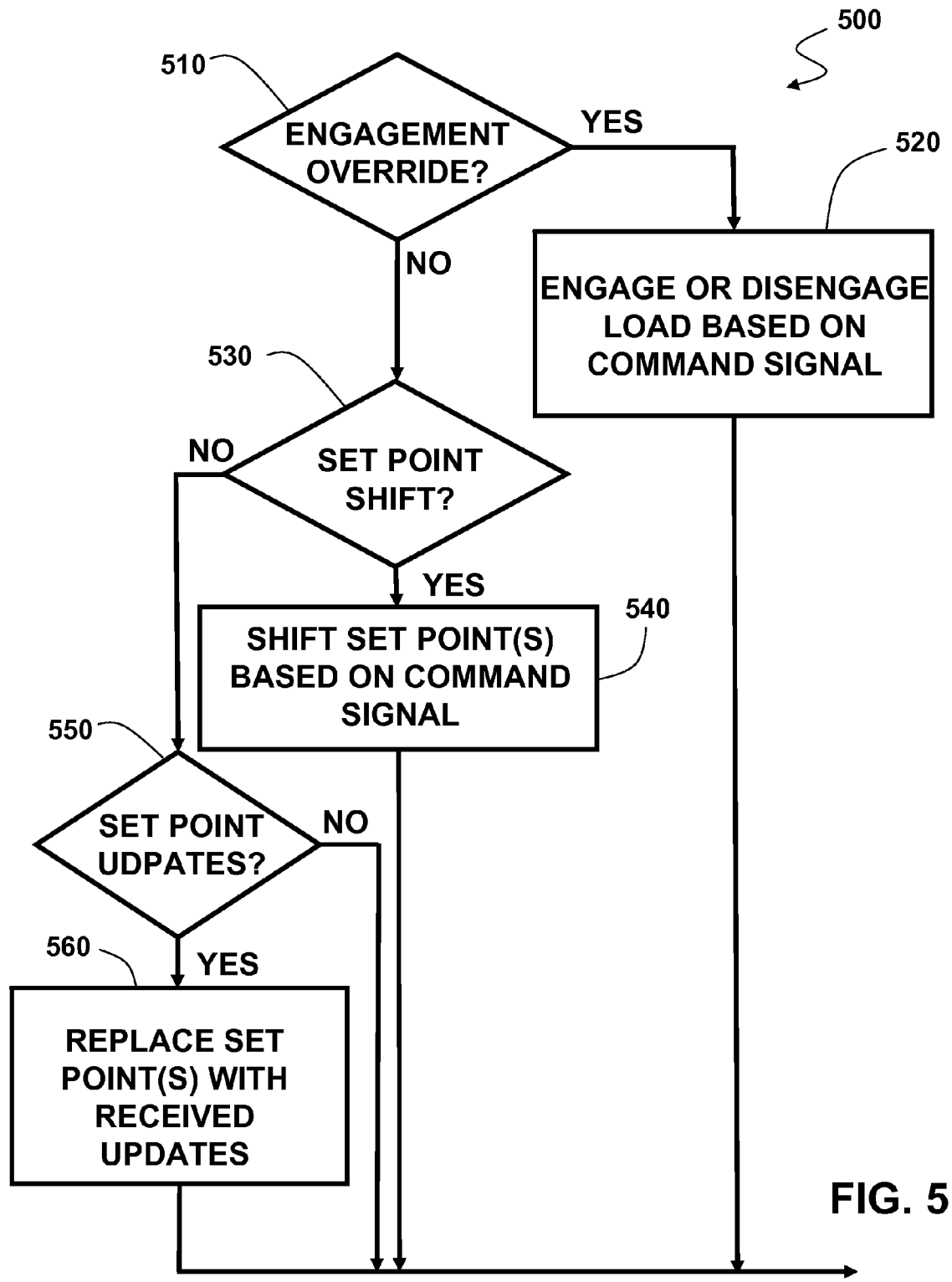
FIG. 5 is a flowchart depicting an exemplary process of a subsystem controller of a local device.

For example, FIG. 5 is a flowchart depicting an exemplary process of a subsystem controller of a local device. The subsystem controller may determine (test 510) whether it has received an engagement override signal, and if so, the subsystem controller engages or disengages a load (step 520) based on information contained in the engagement signal. The subsystem controller may determine (test 530) whether it has received a set point shift command, and if so, the subsystem controller shifts one or more set points (step 540) based on the information contained in the set point shift command signal. The subsystem controller may determine (test 550) whether it has received an update signal for one or more set points, and if so, the subsystem controller replaces one or more received set point updates (step 560) based on the information contained in the set point update signal.

Figure 6:
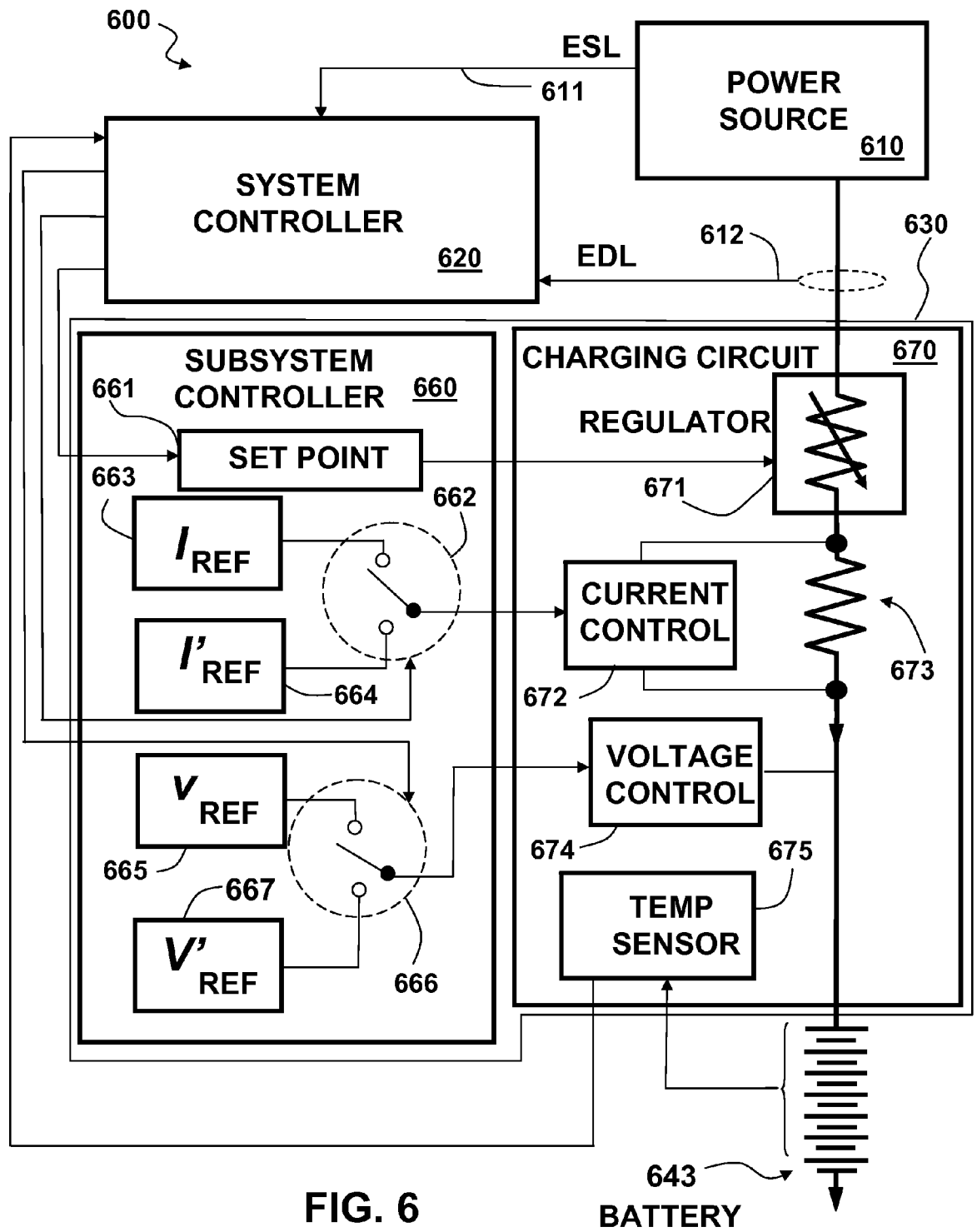
FIG. 6 is a functional block diagram of another exemplary system embodiment.

FIG. 6 is a functional block diagram of an exemplary system embodiment 600 comprising a power source 610, a system controller 620, a local energy load device 630, and a chemical battery 643 or chemical battery array. In place of, or in addition to, the chemical battery, other energy storage devices may be employed, such as kinetic (e.g., flywheel) systems and/or pneumatic (e.g., pressure exchange) systems. The local energy load device 630 is depicted as comprising a subsystem controller 660 and a charging circuit 670. The system controller is depicted as inputting the energy supply level (ESL) 611 of the power source 610 and the energy dissipation level (EDL) 612 as power is being drawn from the power source 610 by the local device 630. Optionally, the EDL 612 may be estimated or a nominal value for each energy load device may be referenced for combination as the EDL 612. The charging circuit 670 effects a change in the energy state of the chemical battery 643, and the temperature of the chemical battery 643 is depicted as being measured by a temperature sensor 675. The output of the temperature sensor 675 may be provided to the subsystem controller 660, the system controller 620, or both. The system controller 620 may generate a command to override the local logic of the subsystem controller 660 to effect an engagement or a disengagement of the charging circuit 670. The subsystem controller 660 may include: a regulator set point 661 that may be preset or overwritten by the system controller 620; and a first current reference value 663, $I_{ref}$, a second current reference value 664, $I'_{ref}$, and a logical switch 662 that may be set via a command signal from the system controller 620. The subsystem controller 660 may also include a first voltage reference value 665, $V_{ref}$, a second voltage reference value 667, $V'_{ref}$, and a second logical switch 666 that may be set via a command signal from the system controller 620. For example, if the system controller 620 determines that, based on the difference between the energy supply level (ESL) 611 and the energy dissipation level (EDL) 612, the battery should be charged to take advantage of the excess in available energy, then the system controller 620 may send a new regulator set point value and/or signals to effect the switching to the second current reference value 664, $I'_{ref}$, and/or to effect the switching to the second voltage reference value 667, $V'_{ref}$. Optionally, the system controller 620 may send replacement values for the current reference, $I_{ref}$, and/or the voltage reference $V_{ref}$. Also optionally, the system controller 620 may send a signal to shift the regulator set point 661 to a preset value. The charging circuit 670 is depicted as comprising a regulator 671, a current controller 672 based on a reference current value, a voltage controller 674 bases on a reference voltage value, and the charging circuit 670 that may include the temperature sensor 675.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A device for energy management comprising:
a central processing unit (CPU) and memory where the CPU is configured to:
engage an energy load device of highest priority not already engaged via a control signal, wherein the control signal invokes a set point override followed by a set point modification, if an energy supply level (ESL) less an error margin value, is greater than a measured energy consumption level (EDL), and wherein the error margin value is based on a hysteresis effect to the device for energy management; and
disengage an energy load device of lowest priority not already disengaged via a release signal, wherein the release signal invokes a relinquishment of an override followed by a restoration of an original set point, if the energy supply level is less than or equal to the measured energy consumption level.

2. The device of claim 1 wherein the control signal comprises a command to override a set point of a regulated energy load device; and the release signal comprises a command to restore a set point of a regulated energy load device having an overridden set point.

3. The device of claim 1 wherein the control signal comprises a command to shift one or more set points, of a regulated energy load device, from nominal values to preset values stored at the regulated energy load device; and the release signal comprises a command to restore one or more shifted set points of a regulated energy load device to the nominal values.

4. The device of claim 1 wherein the control signal comprises one or more set point updates and a command to replace nominal values of one or more set points of a regulated energy load device with an update value; and the release signal comprises a command to restore one or more updated set point values of a regulated energy load device to the nominal values.

5. The device of claim 1 wherein the control signal comprises one or more set point updates and a command to replace one or more set points of a regulated energy load device with an update value; and the release signal comprises nominal values and a command to replace the one or more updated set point values of a regulated energy load device with the received nominal value.

6. The device of claim 1 wherein the device is further configured to provide excess power to an external grid; and wherein a provisioning of excess power to the external grid is based on a capacity of the external grid to receive the excess power.

7. The device of claim 1 wherein the measured energy consumption level is based on an input energy level of dissipation by one or more active loads.

8. A method for energy management in a system of one or more energy load devices, wherein the system further comprises a system controller, the system controller comprising: a processor and memory, the method comprising:
   if the system comprises two or more energy load devices, then establishing an energy load device priority among the two or more energy load devices;
   determining, by the system controller, an energy supply level to the system;
   determining, by the system controller, a total energy consumption level based on the one or more energy load devices;
   determining, by the system controller, an error margin value based on a hysteresis effect to the system of one or more energy load devices for energy management;
   if the energy supply level less the error margin value is greater than a measured energy consumption level, then the system controller engaging a load device of highest priority not already engaged via a control signal, wherein the control signal invokes a set point override followed by a set point modification; and
   if the energy supply level is less than or equal to the measured energy consumption level, then the system controller disengaging a load device of lowest priority not already disengaged via a release signal, wherein the release signal invokes a relinquishment of an override followed by a restoration of an original set point.

9. The method of claim 8 wherein engaging by the system controller is via a control signal comprising a command to override a set point of a regulated energy load device; and the disengaging by the system controller is via a release signal comprising a command to restore a set point of a regulated energy load device having an overridden set point.

10. The method of claim 8 wherein engaging by the system controller is via a control signal comprising a command to shift one or more set points, of a regulated energy load device, from nominal values to preset values stored at the regulated energy load device; and the disengaging by the system controller is via a release signal comprising a command to restore one or more shifted set points of a regulated energy load device to the nominal values.

11. The method of claim 8 wherein the engaging by the system controller is via a control signal comprising one or more set point updates and a command to replace nominal values of one or more set points of a regulated energy load device with an update value; and the disengaging by the system controller is via a release signal comprising a command to restore one or more updated set point values of a regulated energy load device to the nominal values.

12. The method of claim 8 wherein the engaging by the system controller is via a control signal comprising one or more set point updates and a command to replace one or more set points of a regulated energy load device with an update value; and the disengaging by the system controller is via a release signal comprising nominal values and a command to replace the one or more updated set point values of a regulated energy load device with the received nominal value.

13. The method of claim 8 further comprising:
   determining by the system controller whether the system has excess power; and
   determining by the system controller a capacity of an external grid to receive excess power generated by the system.

14. The method of claim 13 further comprising delivering by the system controller to an external grid having a determined capacity to receive excess power.

15. The method of claim 8 wherein the measured energy consumption level is based on an input energy level of dissipation by one or more active loads.

\* \* \* \* \*